(12) United States Patent
Feng et al.

(10) Patent No.: US 11,788,930 B2
(45) Date of Patent: Oct. 17, 2023

(54) DEVICE AND METHOD FOR TESTING BEARING CAPACITY OF SINGLE-ROW GROUPED PILLARS IN HORIZONTAL GOAF UNDER BIAXIAL LOADING

(71) Applicant: Taiyuan University of Technology, Shanxi (CN)

(72) Inventors: Guorui Feng, Taiyuan (CN); Jinwen Bai, Taiyuan (CN); Xudong Shi, Taiyuan (CN); Boqiang Cui, Taiyuan (CN); Xinyu Yang, Taiyuan (CN); Kai Wang, Taiyuan (CN); Haotian Wu, Taiyuan (CN)

(73) Assignee: Taiyuan University of Technology, Taiyuan (CN)

( * ) Notice: Subject to any disclaimer, the term of this patent is extended or adjusted under 35 U.S.C. 154(b) by 3 days.

(21) Appl. No.: 17/584,474

(22) Filed: Jan. 26, 2022

(65) Prior Publication Data
US 2022/0244139 A1    Aug. 4, 2022

(30) Foreign Application Priority Data

Feb. 4, 2021   (CN) .......................... 202110151077.9

(51) Int. Cl.
  *G01N 3/10*      (2006.01)
  *G01M 13/04*     (2019.01)
  *G01L 5/00*      (2006.01)

(52) U.S. Cl.
  CPC ........... *G01M 13/04* (2013.01); *G01L 5/0009* (2013.01)

(58) Field of Classification Search
  CPC ................................................ G01N 3/08–10
  See application file for complete search history.

(56) References Cited

U.S. PATENT DOCUMENTS

| | | | |
|---|---|---|---|
| 2015/0168282 A1* | 6/2015 | He | G01N 3/24 73/841 |
| 2021/0247283 A1* | 8/2021 | Feng | G01N 3/24 |
| 2022/0196527 A1* | 6/2022 | Liu | G01N 33/24 |

FOREIGN PATENT DOCUMENTS

| | | |
|---|---|---|
| CN | 201926587 U | 8/2011 |
| CN | 104089822 A | 10/2014 |

(Continued)

OTHER PUBLICATIONS

Chinese Office Action (w/English transation) dated Apr. 1, 2022 in corresponding Chinese Application No. 202110151077.9 (16 pages).

*Primary Examiner* — Alexander A Mercado
(74) *Attorney, Agent, or Firm* — Harness, Dickey & Pierce, P.L.C.

(57) ABSTRACT

A device and method for testing bearing capacity of single-row grouped pillars in a horizontal goaf under biaxial loading is disclosed. Four fixed rings are arranged on testing machine base, and have stands installed therein respectively, bottom ends of the stands are connected with the base, top ends are connected with transverse frame, sliding rails are arranged on two sides of the base; the vertical force loading devices are arranged at a lower part of transverse frame and the horizontal force loading devices are arranged at inner sides of side frame. Simultaneous loading on multiple coal samples, rock samples, filling body samples, concrete samples, coal-filling samples and/or rock-filling samples can be achieved, the overall bearing capacity of a single-row group pillar system in the horizontal goaf under the biaxial compression condition can be obtained, and the mutual influence relation between grouped pillar individuals in the horizontal goaf can be attained.

11 Claims, 4 Drawing Sheets

(56) References Cited

FOREIGN PATENT DOCUMENTS

| CN | 109765110 A | 5/2019 |
|----|-------------|--------|
| CN | 212321314 U | 1/2021 |

\* cited by examiner

DEVICE AND METHOD FOR TESTING BEARING CAPACITY OF SINGLE-ROW GROUPED PILLARS IN HORIZONTAL GOAF UNDER BIAXIAL LOADING

CROSS REFERENCE TO RELATED APPLICATION

This patent application claims the benefit and priority of Chinese Patent Application No. CN202110151077.9, entitled "Device and Method for Testing Bearing Capacity of Single-row Grouped Pillars in Horizontal Goaf under Biaxial Loading" filed on Feb. 4, 2021, the disclosure of which is incorporated by reference herein in its entirety as part of the present application.

TECHNICAL FIELD

The present disclosure relates to a device and method for testing bearing capacity of single-row grouped pillars in a horizontal goaf under biaxial loading, in particular to a device and method for simultaneously applying loads on multiple coal samples, rock samples, filling body samples, concrete samples, coal-filling samples and/or rock-filling samples, which belongs to the technical field of mining rock mechanical tests.

BACKGROUND ART

Due to the backward mining method in the old mining period, a large number of remaining coal pillars are formed in many mines in China, and mainly comprise cutter pillar type remaining coal pillars, room pillar type remaining coal pillars, strip type remaining coal pillars, short wall type remaining coal pillars, roadway mining type remaining coal pillars, warehouse type remaining coal pillars, skip mining type remaining coal pillars and the like. Those coal pillars are densely distributed in space, are different in shapes, influence one another, are intricate and complex and different in sizes, and are combined in clusters to form a coal pillar group. Similarly, ore pillar group is also formed in a goaf during metal mine mining to bear overburden load and ensure long-term stability of a stope.

Overburden rock movement and surface subsidence can be effectively controlled through filling mining. In recent years, in order to solve the technical problems that filling materials are insufficient in source and high in cost, the technical methods such as partial filling, roadway-side filling, strip filling, pierstud filling, local filling, short wall filling, strip filling, interval filling, pillar-side filling, structural filling, functional filling and framework type filling are applied and popularized in many mines. According to the filling mining technical method described above, filling pillars (concrete pillars) with different sizes/forms are inevitably reserved in the goaf, are distributed in the form of grouped pillars, and are combined to form a filling body grouped pillars or a concrete grouped pillars. Sometimes, in order to maintain the stability of the remaining coal pillars in the goaf, a pillar side filling mode is usually adopted, and equivalently, a transverse load is applied to the coal pillar, so that the coal pillar is in a bidirectional pressed state.

The coal pillar group, the ore pillar group, the filling pillar group and the concrete group discussed above are herein collectively referred to as grouped pillars. The original intention of reserving the grouped pillars in the stope is to bear the overburden load and ensure the long-term stability of the goaf. Long-term stability of the stope grouped pillars is a scientific problem of concern. However, under the coupling actions of overburden load, disturbance load, mine water erosion, sulfate corrosion, chlorine salt corrosion, natural weathering and the like, the bearing capacity of the grouped pillars in the stope is gradually weakened, which may cause instability of a grouped pillar system, and in turn lead to disasters such as overlying rock collapse and surface subsidence. Thus, serious potential safety hazards are brought to safe and efficient mining of coal resources.

There exists mutual influence among independent individuals of the stope group pillars. And overburden load, disturbance load and the like are not borne by the single pillar body in the stope, but are mainly borne by the grouped pillars system together. If the local instability failure of one pillar body occurs, the overburden load and the disturbance load will be transferred, which further causes the instability failure of the adjacent pillar groups, and leads to the domino chain type instability of the grouped pillars in the stope. Therefore, it is very necessary to test the overall bearing capacity of the grouped pillar system in the stope. At present, the on-site monitoring of the overall bearing capacity of the stope grouped pillars is difficult to implement, and only a small-size grouped pillar sample in a laboratory can be used for testing. A traditional testing machine can only load a single pillar sample, and cannot load a grouped pillar sample.

In conclusion, there is an urgent need to develop a device and method for testing the overall bearing capacity of the stope grouped pillars, so that the overall bearing capacity of the stope group pillar system is obtained, the mutual influence relation among group pillar individuals is obtained, to lay a foundation for revealing chain type instability response characteristics and mechanisms of the stope group pillars, and provide guidance for researching and developing chain type instability prevention and control technology the stope group pillar. The present disclosure intends to provide a device and method for testing bearing capacity of single-row grouped pillars in a horizontal goaf under biaxial loading, focusing on the single-row group pillars in the horizontal goaf.

SUMMARY

The present disclosure aims to provide a device and method for testing bearing capacity of single-row grouped pillars in a horizontal goaf under biaxial loading, particularly relates to a device for simultaneously applying loads on multiple coal samples, rock samples, filling body samples, concrete samples, coal-filling samples and/or rock-filling samples, and can obtain the mutual influence relationship between the individuals of the grouped pillars, in order to lay a foundation for revealing chain type instability response characteristics and mechanisms of the stope grouped pillars, and provide guidance for researching and developing chain type instability prevention and control technologies of the stope grouped pillars.

The present disclosure provides a device for testing bearing capacity of single-row grouped pillars in a horizontal goaf under biaxial loading, comprising a testing machine base, stands, lower pressure disks, upper pressure disks, an upper pressing plate, a workbench, a transverse frame, vertical force loading devices, protection rings, vertical pushing shaft housings, fixed rings, screws, horizontal force loading devices, side frames, telescopic stand pillars, sliding wheels and sliding rails;

four fixed rings are arranged on the testing machine base, and have the stands installed therein respectively, bottom ends of the stands are connected with the base, and top ends of the stands are connected with the transverse frame, the sliding rails are arranged on two sides of the base, and the side frames are slidably connected with the base through the telescopic stand pillars; the vertical force loading devices are arranged at a lower part of the transverse frame and the horizontal force loading devices are arranged at inner sides of the side frames, and each of the vertical force loading devices comprises a vertical hydraulic pushing shaft, a vertical hydraulic pump and a pressure sensor; and each of the horizontal force loading devices comprises a transverse hydraulic pushing shaft, transverse pressing plates, a transverse hydraulic pump and a pressure sensor; and the lower pressure disks are installed on the workbench, samples are positioned between the lower pressure disks and the upper pressing plate, side faces of the samples are in contact with transverse pressing plates, the horizontal force loading devices act on the samples through the transverse pressing plates, and the vertical force loading devices act on the samples through the upper pressure disks and the upper pressing plate.

In the above device, the goaf is a space formed after mining of a near-horizontal coal seam with an inclination angle of less than 5°; and the grouped pillars comprise one selected from a group consisting of a coal pillar group, an ore pillar group, a filling pillar group, a concrete pillar group, a coal pillar-filling pillar combined pillar group, an ore pillar-filling pillar combined pillar group and a coal pillar-concrete pillar combined pillar group; and a cross section of each of the grouped pillars is circular, rectangular, triangular or trapezoidal.

In the above device, four protection rings are arranged on the base, and have the stands installed therein respectively, the side frames are installed on the sliding rails through the telescopic stand pillars and the sliding wheels, and the sliding rails are fixed to the base.

In the above device, the workbench has a length of 2000 mm, a width of 400 mm, and a height of 400 mm, and five lower pressure disks positioned on a same central line are installed on the workbench, the lower pressure disks are fixed on the workbench through screws, such that uniaxial bearing capacity of one to five samples can be simultaneously monitored; and a diameter of an upper end of each of the lower pressure plates is 150 mm, and a diameter of an lower end of each of the lower pressure plate is 300 mm.

In the above device, five groups of vertical force loading devices are arranged on the lower portion of the transverse frame in the vertical direction, and five groups of horizontal force loading devices are arranged on an inner side of one side frame in the transverse direction, another five groups of horizontal force loading devices are arranged on an inner side of an other side frame in the transverse direction, and a pressure sensor is arranged in each force loading device, the pressure sensor is connected with a microcomputer through a control circuit, and a force state of each sample can be accurately controlled.

In the above device, the upper pressure disks each are connected with respective vertical hydraulic pushing shaft, and are used for loading different samples at a same speed or different speeds, for simulating situations that the samples are subjected to uniform vertical pressure or non-uniform vertical pressure; and the transverse pressing plates each are connected with respective transverse hydraulic pushing shaft, and are used for loading different samples at a same speed or different speeds, for simulating the situations that the samples are subjected to uniform transverse pressure or non-uniform transverse pressure.

The upper pressing plate is be of two types, one type is a rectangular plate used for researching bearing capacity of a plurality of samples which commonly bear an overburden load, and an other type is a square plate used for simultaneously researching bearing capacity of a plurality of samples as a whole.

The present disclosure provides a method for testing bearing capacity of single-row grouped pillars in a horizontal goaf under biaxial loading, comprising the following steps:

researching step, for comprehensively researching distribution positions, forms and sizes of grouped pillars remaining in the horizontal goaf in a to-be-tested range by virtue of technical mean of supplementary exploration by utilizing original geological technical data of a mine;

determining shapes, sizes and a number of the samples based on an information of the grouped pillars remaining in the horizontal goaf obtained in the researching step;

drilling the samples with appropriate sizes by using a coring machine special for coal rock in a manner of manual multi-stage variable-speed feeding, and cutting and grinding the samples to the shape and size required for the test by using a coal rock cutting machine;

sequentially installing the samples on the lower pressure disks on the workbench;

selecting a type of the upper pressing plate according to experimental requirements, wherein selecting a first type of upper pressing plate when the bearing capacity of the plurality of samples jointly bearing the overburden load is tested, and selecting and installing a second type of upper pressing plate when the bearing capacity of the plurality of samples as a whole under uniaxial loading is tested;

resetting the pressure sensor to clean a force value thereof to zero, and performing vertical preloading;

transverse loading step, for setting a magnitude of a load applied transversely, and controlling the transverse hydraulic pushing shaft to load to a target value through the transverse hydraulic pump;

vertical loading step, for setting a loading speed of the vertical hydraulic pushing shaft after the transverse loading step is completed, and carrying out loading; and controlling the vertical hydraulic pushing shaft through the vertical hydraulic pump, and controlling the transverse hydraulic pushing shaft through the transverse hydraulic pump for unloading after the vertical loading step is completed, so that the test is finished.

The present disclosure has the following beneficial effects:

According to the present disclosure, simultaneous loading on multiple coal samples, rock samples, filling body samples, concrete samples, coal-filling samples and rock-filling samples can be realized, and further simulation of loading failure of a plurality of body pillars can be effected, and moreover, uniform and non-uniform loading of a plurality of grouped pillars can be achieved through a plurality of hydraulic pushing shafts, and the biaxial bearing loading capacity of a group pillar system under the disturbance effect can be researched.

Figure 1:
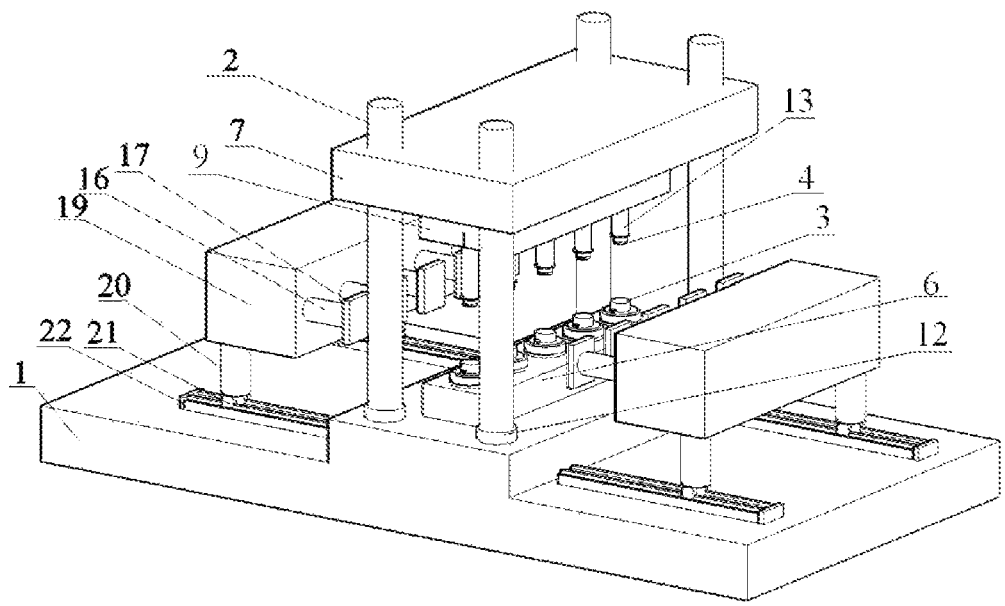
FIG. 1 is a structural schematic diagram of a device in accordance with present disclosure.
Figure 2:
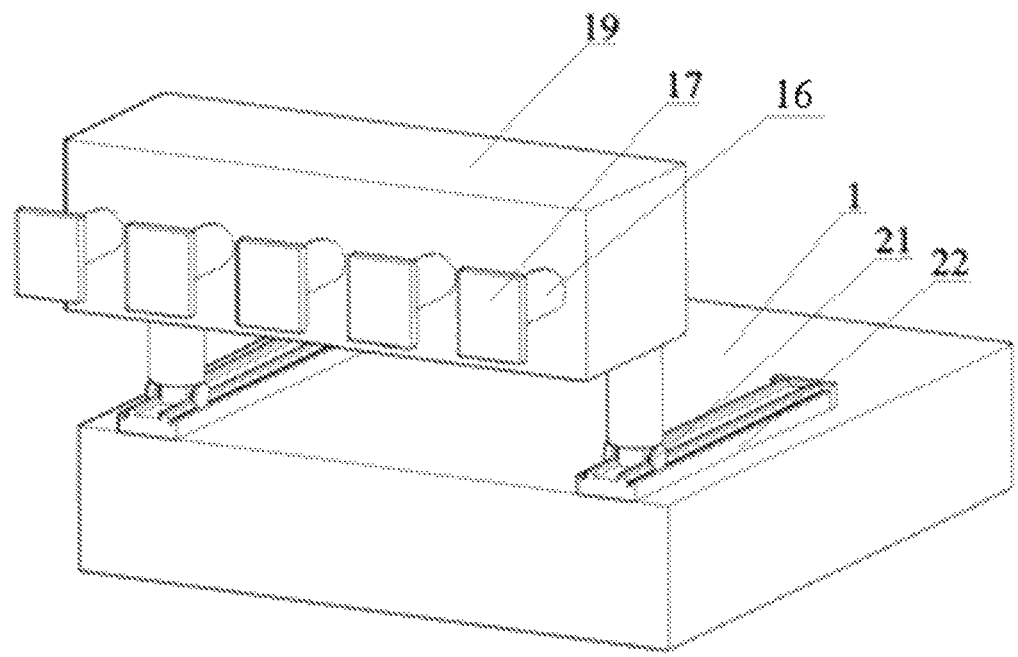
FIG. 2 is a schematic diagram of a transverse loading structure in accordance with the present disclosure.

REFERENCE NUMERALS 1, base; 2, stand; 3, lower pressure disk; 4, upper pressure disk; 5, upper pressing plate; 6, workbench; 7, transverse frame; 8, vertical hydraulic pushing shaft; 9, vertical hydraulic pump; 10, pressure sensor; 11, force loading device; 12, protection ring; 13, vertical pushing shaft housing; 14, fixed ring; 15, screw; 16, transverse hydraulic pushing shaft; 17, transverse pressing plate; 18, transverse hydraulic pump; 19, side frame; 20, telescopic stand pillar; 21, sliding wheel; 22, sliding rail; 23, sample.

DETAILED DESCRIPTION OF THE EMBODIMENTS

The present disclosure is further illustrated below through embodiments, but not limited to the following embodiments.

Embodiment I

As shown in FIG. 1 to FIG. 8, a device for testing bearing capacity of single-row grouped pillars in a horizontal goaf under biaxial loading includes a testing machine base 1, stands 2, lower pressure disks 3, upper pressure disks 4, upper pressing plates 5, a workbench 6, a transverse frame 7, vertical hydraulic pushing shafts 8, vertical hydraulic pumps 9, pressure sensors 10, force loading devices 11, protection rings 12, vertical pushing shaft housings 13, fixed rings 14, screws 15, transverse hydraulic pushing shafts 16, transverse pressing plates 17, transverse hydraulic pumps 18, side frames 19, telescopic stand pillars 20, sliding wheels 21 and sliding rails 22.

Four protection rings 12 are arranged on the base 1, and a stand 2 is installed in each protection ring 12, one end of the stand 2 is connected with the base 1, and the other end of the stand 2 is connected with the transverse frame 7. A lower portion of the transverse frame 7 is connected with five vertical hydraulic pushing shafts 8, and each of the vertical hydraulic pushing shafts 8 is connected with an upper pressure disk 4, as shown in FIG. 1.

Figure 3:
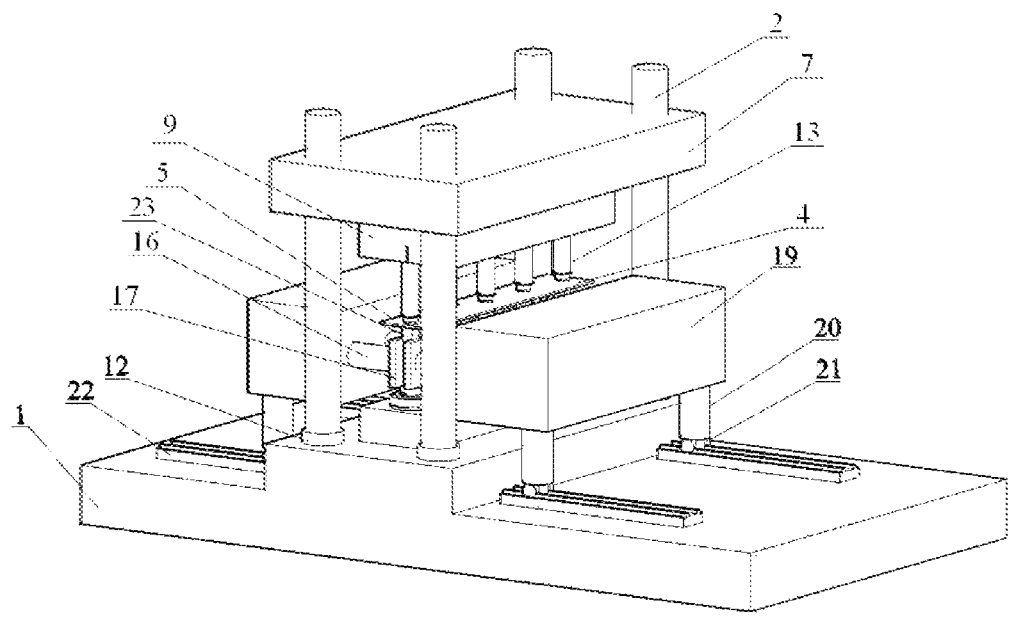
FIG. 3 is a schematic diagram of a working scenario of a first upper pressing plate in the present disclosure.
Figure 4:
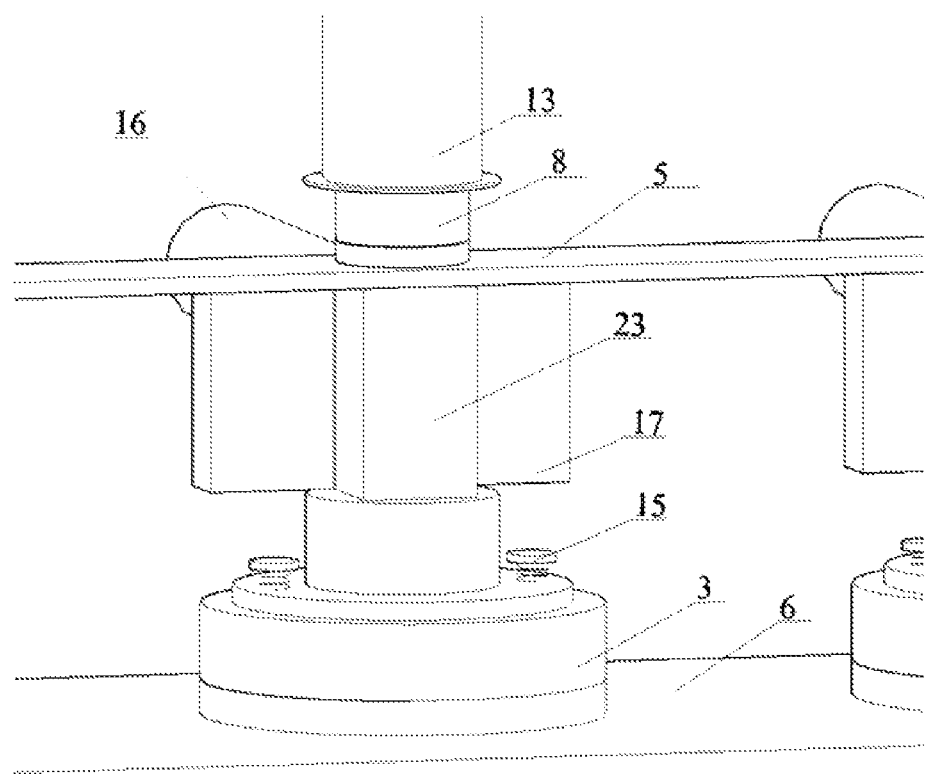
FIG. 4 is a schematic diagram of a loading structure of the first upper pressing plate in the present disclosure.
Figure 5:
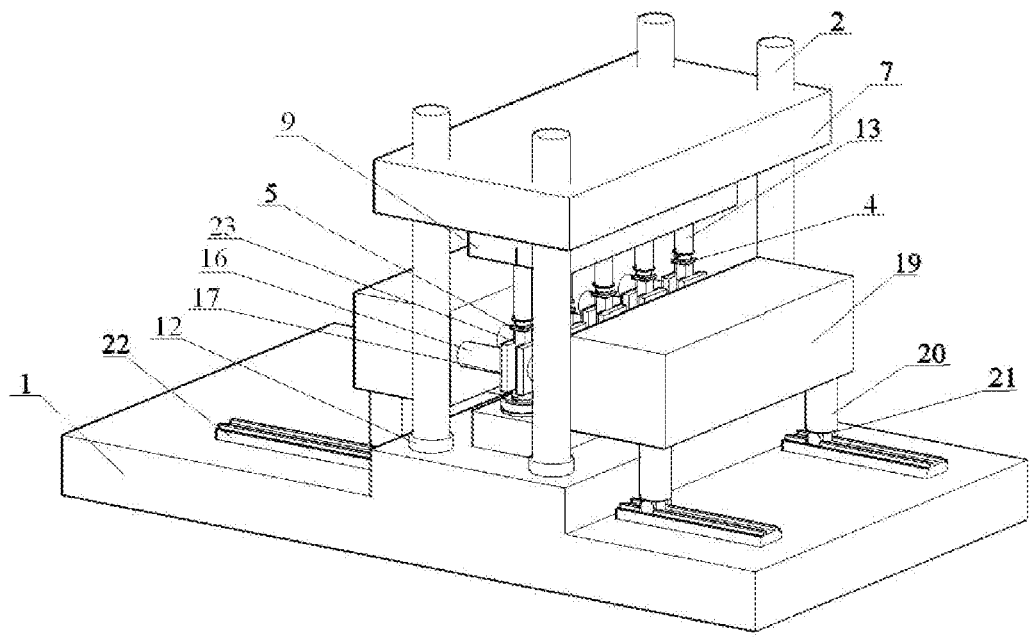
FIG. 5 is a schematic diagram of a working scenario of a second upper pressing plate in the present disclosure.
Figure 6:
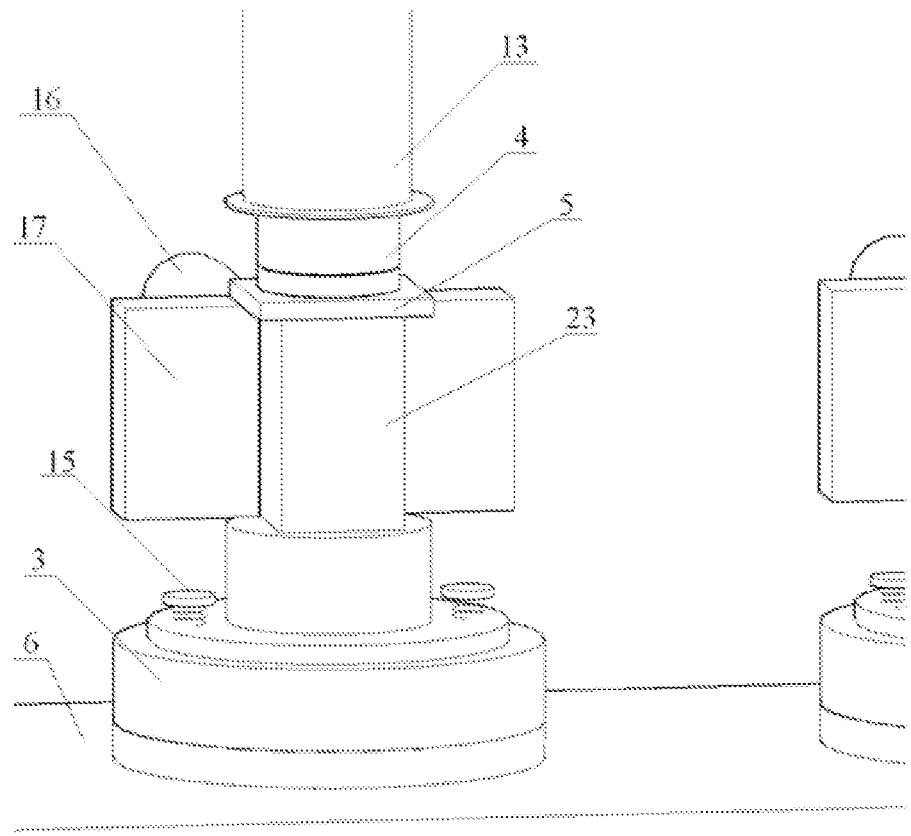
FIG. 6 is a schematic diagram of a loading structure of a second upper pressing plate in the present disclosure.
Figure 7:
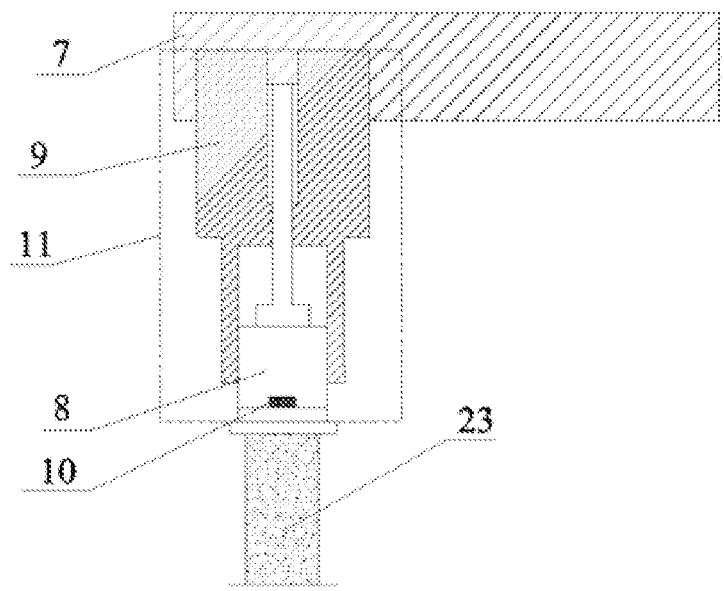
FIG. 7 is a schematic diagram of a vertical force loading device.
Figure 8:
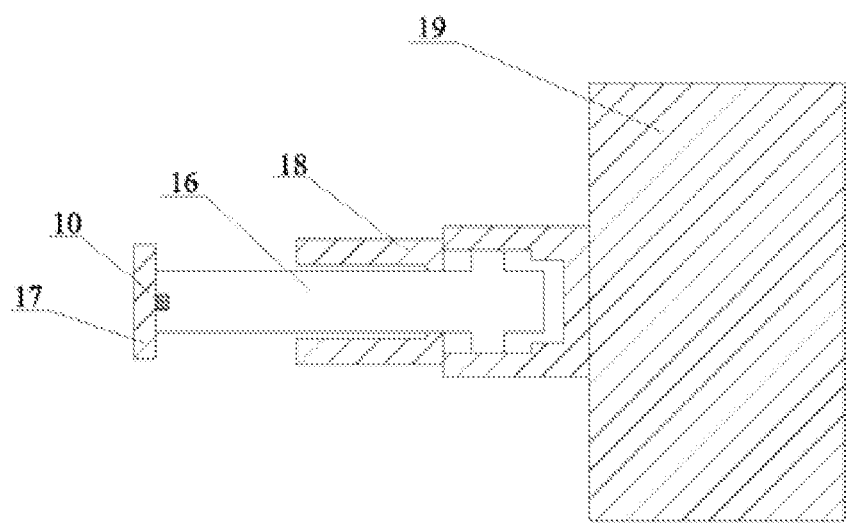
FIG. 8 is a schematic diagram of a transverse force loading device.

In some embodiments, five lower pressure disks 3 are arranged on the workbench 6, and can be used for loading one to five samples of coal samples, rock samples and/or filling body samples at the same time, as shown in FIG. 3.

In some embodiments, the device is provided with five groups of force loading devices in the vertical direction and ten groups of force loading devices in the transverse direction, and each force loading device includes a pressure sensor 10, a hydraulic pump 9 and a hydraulic pushing shaft 8, as shown in FIG. 1.

In some embodiments, a pressure sensor 10 is arranged in each hydraulic system of the device, and each of the pressure sensors is connected with a microcomputer via a control circuit, so that the force state of each sample can be accurately controlled.

In some embodiments, each upper pressure disk 4 is connected with a vertical hydraulic pushing shaft 8, so that different samples can be loaded at the same speed or different speeds, for simulating the situations that the samples are subjected to uniform vertical pressure or non-uniform vertical pressure. Each transverse pressing plate 17 is connected with a transverse hydraulic pushing shaft 16, so that different samples are load at the same speed and different speeds, for simulating the situations that the samples are subjected to uniform transverse pressure or non-uniform transverse pressure, as shown in FIG. 1.

In some embodiments, central points of the lower pressure disks 3 are positioned on the same straight line; and central points of the transverse pressing plates 17 are positioned on the same straight line, as shown in FIG. 1.

In some embodiments, the side frames 19 are installed on the sliding rails 22 through the telescopic stand pillars 20 and the sliding wheels 21, and the sliding rails 21 are fixed to the base 1.

In some embodiments, the side frames 19 can be adjusted in height through the telescopic stand pillars 20, in position through the sliding rails 22, according to actual needs.

In some embodiments, the device can be used for biaxial pressing of the grouped pillars, loads transmitted by the upper pressing plates are commonly borne by the group pillars, and the bearing capacity of the group pillar system to the overburden load under the biaxial force can be researched.

Embodiment II

As shown in FIG. 1, FIG. 2, FIG. 4 and FIG. 5, a device and method for testing bearing capacity of single-row grouped pillars in a horizontal goaf under biaxial loading includes a testing machine base 1, stands 2, lower pressure disks 3, upper pressure disks 4, upper pressing plates 5, a workbench 6, a transverse frame 7, vertical hydraulic pushing shafts 8, vertical hydraulic pumps 9, pressure sensors 10, force loading devices 11, protection rings 12, vertical pushing shaft housings 13, fixed rings 14, screws 15, transverse hydraulic pushing shafts 16, transverse pressing plates 17, transverse hydraulic pumps 18, side frames 19, telescopic stand pillars 20, sliding wheels 21 and sliding rails 22.

Four protection rings 12 are arranged on the base 1, and a stand 2 is installed in each protection ring 12, one end of the stand 2 is connected with the base 1, the other end of the stand 2 is connected with the transverse frame 7. The lower portion of the transverse frame 7 is connected with five vertical hydraulic pushing shafts 8, and each of the vertical hydraulic pushing shafts 8 is connected with an upper pressure disk 4, as shown in FIG. 1.

In some embodiments, five lower pressure disks 3 are arranged on the workbench 6, and can be used for loading one to five samples of coal samples, rock samples and/or filling body samples at the same time, as shown in FIG. 3.

In some embodiments, the device is provided with five force loading devices in the vertical direction and ten force loading devices in the transverse direction, and each force loading device includes a pressure sensor 10, a hydraulic pump 9 and a hydraulic pushing shaft 8, as shown in FIG. 1.

In some embodiments, a pressure sensor 10 is arranged in each hydraulic system of the device, and the pressure sensor is connected with a microcomputer via a control circuit, so that the force state of each sample can be accurately controlled.

In some embodiments, each upper pressure disk 4 is connected with a vertical hydraulic pushing shaft 8, so that different samples can be loaded at the same speed or different speeds, for simulating the situations that the samples are subjected to uniform vertical pressure or non-uniform vertical pressure. Each transverse pressing plate 17 is connected with a transverse hydraulic pushing shaft 16, so that different samples can be loaded at the same speed or different speeds, for simulating the situations that the samples are subjected to uniform transverse pressure or non-uniform transverse pressure, as shown in FIG. 1.

In some embodiments, the central points of the lower pressure disks 3 are positioned on the same straight line; and the central points of the transverse pressing plates 17 are positioned on the same straight line, as shown in FIG. 1.

In some embodiments, the side frames 19 are installed on the sliding rails 22 through the telescopic stand pillars 20 and the sliding wheels 21, and the sliding rails 21 are fixed to the base 1.

In some embodiments, five lower pressure disks 3 are arranged on the workbench 5, and can be used for biaxially loading one to five samples of coal samples, rock samples and/or filling body samples at the same time, so that the experimental efficiency is greatly improved.

In some embodiments, operating steps of the device includes the following steps: determining a number of samples to be tested simultaneously according to the experimental requirements; sequentially installing the samples on the lower pressure disks 3 on the workbench 6; selecting a type of the upper pressing plates 5 according to experimental requirements, and installing the upper pressing plates 5; resetting each sensor 10 to clean the force value of each sensor 10 to zero, and performing vertical preloading; setting the magnitude of load applied transversely and controlling the hydraulic pushing shaft 16 to load to a target value through the transverse hydraulic pump 18; after the transverse loading is completed, setting the loading speed of each vertical hydraulic pushing shaft 8 for loading; after loading is completed, controlling the hydraulic pushing shaft 8 through the axial hydraulic pump 9, and controlling the transverse hydraulic pushing shaft 16 through the transverse hydraulic pump 18 for unloading, so that the test is finished.

The above is only embodiments of the present disclosure, and it should be noted that the present disclosure is not limited to the above-described embodiments, and may be simply modified in accordance with the essence of the present disclosure, which all fall within the scope of the technical solutions of the present disclosure.

What is claimed is:

1. A device for testing bearing capacity of single-row grouped pillars in a horizontal goaf under biaxial loading, comprising a testing machine base, stands, lower pressure disks, upper pressure disks, an upper pressing plate, a workbench, a transverse frame, vertical force loading devices, protection rings, vertical pushing shaft housings, screws, horizontal force loading devices, side frames, telescopic stand pillars for adjusting a height of the side frames, sliding wheels and sliding rails, four protection rings are arranged on the testing machine base, and have the stands installed therein respectively, bottom ends of the stands are connected with the base, and top ends of the stands are connected with the transverse frame, the sliding rails are arranged on two sides of the base, and the side frames are slidably connected with the base through the telescopic stand pillars; the vertical force loading devices are arranged at a lower part of the transverse frame and the horizontal force loading devices are arranged at inner sides of the side frames, and each of the vertical force loading devices comprises a vertical hydraulic pushing shaft, a vertical hydraulic pump and a first pressure sensor; and each of the horizontal force loading devices comprises a transverse hydraulic pushing shaft, transverse pressing plates, a transverse hydraulic pump and a second pressure sensor; and the lower pressure disks are installed on the workbench, samples are positioned between the lower pressure disks and the upper pressing plate, side faces of the samples are in contact with the transverse pressing plates, the horizontal force loading devices act on the samples through the transverse pressing plates, and the vertical force loading devices act on the samples through the upper pressure disks and the upper pressing plate.

2. The device according to claim 1, wherein four protection rings are arranged on the base, and have the stands installed therein respectively, the side frames are installed on the sliding rails through the telescopic stand pillars and the sliding wheels, and the sliding rails are fixed to the base.

3. The device according to claim 2, wherein the workbench has a length of 2000 mm, a width of 400 mm, and a height of 400 mm, and five lower pressure disks positioned on a same central line are installed on the workbench, the lower pressure disks are fixed on the workbench through screws; and a diameter of an upper end of each of the lower pressure plates is 150 mm, and a diameter of an lower end of each of the lower pressure plate is 300 mm.

4. The device according to claim 1, wherein a number of the vertical force loading devices is five, which are arranged at the lower part of the transverse frame; a number of the horizontal force loading devices is ten, which are transversely arranged on the inner sides of the side frames, the first pressure sensor is arranged in each of the five vertical force loading devices and the second pressure sensor is arranged in each of the ten horizontal force loading devices, each of the first pressure sensor and the second pressure sensor is connected with a microcomputer through a control circuit.

5. The device according to claim 1, wherein the upper pressure disks each are connected with respective vertical hydraulic pushing shaft, and are used for loading force onto different samples at a same speed or different speeds, such that the samples are subjected to uniform vertical pressure or non-uniform vertical pressure; and the transverse pressing plates each are connected with respective transverse hydraulic pushing shaft, and are used for loading force onto different samples at a same speed or different speeds, such that the samples are subjected to uniform transverse pressure or non-uniform transverse pressure.

6. The device according to claim 1, wherein the upper pressing plate is a rectangular plate which contacts samples for obtaining bearing capacity of the samples comprises a plurality of square plates each of which contacts a corresponding one of the samples for obtaining bearing capacity of the corresponding one of the samples.

7. A method for testing bearing capacity of single-row grouped pillars in a horizontal goaf under biaxial loading, by using the device according to claim 1, comprising following steps:

drilling the samples by using a coring machine for coal rock in a manner of manual multi-stage variable-speed feeding, and cutting and grinding the samples by using a coal rock cutting machine;

sequentially installing the samples on the lower pressure disks on the workbench;

using a rectangular plate which contacts samples for obtaining bearing capacity of the samples, or using a plurality of square plates each of which contacts a corresponding one of the samples for obtaining bearing capacity of the corresponding one of the samples;

performing vertical preloading;

transverse loading step, for setting a magnitude of a load applied transversely, and controlling the transverse hydraulic pushing shaft to load to a target value through the transverse hydraulic pump;

vertical loading step, for setting a loading speed of the vertical hydraulic pushing shaft after the transverse loading step is completed, and carrying out loading, and controlling the vertical hydraulic pushing shaft through the vertical hydraulic pump, and controlling the transverse hydraulic pushing shaft through the transverse hydraulic pump for unloading after the vertical loading step is completed.

8. The method according to claim 7, wherein four protection rings are arranged on the base, and have the stands installed therein respectively, the side frames are installed on the sliding rails through the telescopic stand pillars and the sliding wheels, and the sliding rails are fixed to the base.

9. The method according to claim 8, wherein the workbench has a length of 2000 mm, a width of 400 mm, and a height of 400 mm, and five lower pressure disks positioned on a same central line are installed on the workbench, the lower pressure disks are fixed on the workbench through screws; and a diameter of an upper end of each of the lower pressure plates is 150 mm, and a diameter of an lower end of each of the lower pressure plate is 300 mm.

10. The method according to claim 7, wherein a number of the vertical force loading devices is five, which are arranged at the lower part of the transverse frame; a number of the horizontal force loading devices is ten, which are transversely arranged on the inner sides of the side frames, and the first pressure sensor is arranged in each of the five vertical force loading devices and the second pressure sensor is arranged in each of the ten horizontal force loading devices, each of the first pressure sensor and the second pressure sensor is connected with a microcomputer through a control.

11. The method according to claim 7, wherein the upper pressure disks each are connected with respective vertical hydraulic pushing shaft, and are used for loading force onto different samples at a same speed or different speeds such that the samples are subjected to uniform vertical pressure or non-uniform vertical pressure; and the transverse pressing plates each are connected with respective transverse hydraulic pushing shaft, and are used for loading force onto different samples at a same speed or different speeds such that the samples are subjected to uniform transverse pressure or non-uniform transverse pressure.

\* \* \* \* \*